US007346840B1

(12) United States Patent
Ravishankar et al.

(10) Patent No.: US 7,346,840 B1
(45) Date of Patent: Mar. 18, 2008

(54) APPLICATION SERVER CONFIGURED FOR DYNAMICALLY GENERATING WEB FORMS BASED ON EXTENSIBLE MARKUP LANGUAGE DOCUMENTS AND RETRIEVED SUBSCRIBER DATA

(75) Inventors: Geetha Ravishankar, Glen Allen, VA (US); Govind V. Pande, Richmond, VA (US); Satish Joshi, Glen Allen, VA (US); Zhiwei Zhang, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 714 days.

(21) Appl. No.: 09/791,895

(22) Filed: Feb. 26, 2001

(51) Int. Cl.
*G06N 3/00* (2006.01)

(52) U.S. Cl. .................................................. 715/505

(58) Field of Classification Search ............... 715/513, 715/500, 501, 517, 523, 530; 345/854, 769; 379/67.1
See application file for complete search history.

(56) References Cited

U.S. PATENT DOCUMENTS

| | | | |
|---|---|---|---|
| 4,837,798 A * | 6/1989 | Cohen et al. ............ 379/88.14 |
| 6,351,767 B1 * | 2/2002 | Batchelder et al. ......... 709/219 |
| 6,385,642 B1 * | 5/2002 | Chlan et al. ................ 709/203 |
| 6,456,308 B1 * | 9/2002 | Agranat et al. ............. 345/854 |
| 6,484,177 B1 * | 11/2002 | Van Huben et al. .......... 707/10 |
| 6,549,612 B2 * | 4/2003 | Gifford et al. ............. 379/67.1 |
| 6,557,005 B1 * | 4/2003 | Burget ........................ 707/102 |
| 6,678,705 B1 * | 1/2004 | Berchtold et al. .......... 707/204 |
| 2002/0065667 A1 * | 5/2002 | Kingsley ........................ 705/1 |
| 2002/0083095 A1 * | 6/2002 | Wu et al. .................... 707/513 |
| 2002/0120866 A1 * | 8/2002 | Mitchell et al. ............ 713/201 |
| 2002/0143815 A1 * | 10/2002 | Sather ......................... 707/513 |

OTHER PUBLICATIONS

XML in 10 points; Mar. 27, 1999; 3 sheets.
XHTML™ 1.0: The Extensible HyperText Markup Language—W3C Recommandation Jan. 26, 2000.

* cited by examiner

*Primary Examiner*—Stephen Hong
*Assistant Examiner*—Kyle R Stork
(74) *Attorney, Agent, or Firm*—Leon R. Turkevich

(57) ABSTRACT

An application server, configured for dynamically generating a web page (e.g., HTML) document based on execution of XML documents, dynamically generates an HTML page having selected form elements based on a stored XML document that defines available HTML form elements and respective attributes, and based on user attributes retrieved by the application server from an open network database server (such as LDAP). The application server, in response to a request from a user, accesses an XML document configured for specifying attributes associated with the request; the XML document may specify as form elements menus that are available for generation based on qualified user attributes, or may specify HTML fields that can be generated for display on the HTML page based on the qualified user attributes. The application server also retrieves the user attributes, and dynamically generates the HTML page based on identifying the user attributes matching the qualified user attributes of the accessed XML document. Hence, HTML pages having form elements can be dynamically generated, providing personalized HTML pages without the necessity of modifying CGI scripts or stored HTML pages.

39 Claims, 9 Drawing Sheets

```
<?xml version="1.0"?>
<!DOCTYPE DOCUMENT[
  <!ELEMENT DOCUMENT (Menu Variables)>

<!ELEMENT MenuVariables (#PCDATA)*>
  <!ATTLIST MenuVariables id ID #REQUIRED
                name CDATA #REQUIRED
            parent IDREF #IMPLIED
                value CDATA #IMPLIED>

]>
```

300a → <DOCUMENT>
<MenuVariables    id="SubscriberProvisioning"    name="Subscriber Provisioning" />    ← 302a 300b → <MenuVariables    id="AddSubscriber"    ← 304a    name="Add Subscriber"
306 → parent="SubscriberProvisioning"
value="ADMIN_ADD_SUBSCRIBER_FORM1"/>    ← 308a <MenuVariables    id="AddMessageNotificationInformation"    name="Add Message Notification Information"    ← 304b 300c → 306 → parent="SubscriberProvisioning"
value="ADMIN_SEARCH_FILTER~ADMIN_UMSA_ADD_MSG NOTF_FORM1"/>    ← 308b
...

<MenuVariables    id="COSAdministration"    name="COS Administration" />
<MenuVariables    id="AddCOS"    name="Add Class of Service"
parent="COSAdministration"
value="ADMIN_ADD_COS_FORM1"/>
<MenuVariables    id="ModifyCOS"    name="Modify Class of Service"
parent="COSAdministration"
value="ADMIN_COS_SEARCH_FILTER~ADMIN_UMSA_MODIFY_COS_FORM1"/>

...

<MenuVariables    id="Preferences"    name="Preferences"/>
<MenuVariables    id="AttendantCallCoverage"    name="Attendant Call Coverage"
parent="Preferences"
value="ADMIN_MODIFY_ATTDNT_CALL_COVERAGE"/>
<MenuVariables    id="TelephoneAccessPassword"    name="Telephone Access Password"
parent="Preferences"
value="ADMIN_MODIFY_TEL_ACCESS_PASSWD"/>
<MenuVariables    id="EmailAccessPassword"    name="Email Access Password"
parent="Preferences"
value="ADMIN_MODIFY_EMAIL_ACCESS_PASSWD"/>
<MenuVariables    id="MessagePlay"    name="Message Play"
parent="Preferences"
value="ADMIN_MODIFY_MESSAGE_PLAY"/>

...

<MenuVariables    id="LogOut"    name="Log Out"/>
</DOCUMENT>

```
<?xml version="1.0"?>
<!DOCTYPE DOCUMENT [
<!ELEMENT DOCUMENT (CELL)>
    <!ELEMENT CELL ((INPUT | SELECT | HEADING | MESSAGE | TEXT | BOLDTEXT), MAPPING?,
            RULESET?, COMMENT?)>

<!ELEMENT SELECT (OPTION)*>
    <!ATTLIST CELL    name            CDATA #IMPLIED
                formname        CDATA #IMPLIED
                formelementtype CDATA #IMPLIED
                linebreak       CDATA #IMPLIED
                repeat          CDATA #IMPLIED
                repeatnumber    CDATA #IMPLIED>

<!ATTLIST INPUT   type        CDATA #IMPLIED
            value       CDATA #IMPLIED
            action      CDATA #IMPLIED
            text        CDATA #IMPLIED
            gtext       CDATA #IMPLIED
            size        CDATA #IMPLIED
            maxlength   CDATA #IMPLIED
            minlength   CDATA #IMPLIED>

<!ATTLIST HIDDEN  type        CDATA #IMPLIED
            value       CDATA #IMPLIED>

<!ATTLIST SELECT  size        CDATA #IMPLIED
            text        CDATA #IMPLIED
            multiple    CDATA #IMPLIED
            options     CDATA #IMPLIED
            optarray    CDATA #IMPLIED
            file        CDATA #IMPLIED>

<!ATTLIST HEADING text        CDATA #IMPLIED>

<!ATTLIST TEXT    text        CDATA #IMPLIED>

<!ATTLIST OPTION  text        CDATA #IMPLIED
            filename    CDATA #IMPLIED
            value       CDATA #IMPLIED
            selected    CDATA #IMPLIED>

<!ATTLIST MAPPING bindtoattribute CDATA #IMPLIED>

<!ATTLIST RULESET regex       CDATA #IMPLIED
            length          CDATA #IMPLIED
            errorcode       CDATA #IMPLIED
            validatefortype CDATA #IMPLIED
            value           CDATA #IMPLIED>

<!ATTLIST MESSAGE var         CDATA #IMPLIED>

<!ATTLIST COMMENT text        CDATA #IMPLIED>
]>
```

Figure 7A

```xml
<DOCUMENT>
    <CELL name="FormTitle1" formname="umsaadmin" formelementtype="heading" linebreak="1">
        <HEADING text="Subscriber Provisioning: Add Subscriber "/>
    </CELL>
    <CELL name="FormTitle2" formname="umsaadmin" formelementtype="subheading" linebreak="1" >
        <HEADING text="General Information for Subscriber:"/>
    </CELL>
    <CELL name="top_objclass_dn" formname="umsaadmin" formelementtype="select" linebreak="1" helpsection="entrydn">
        <SELECT size="1" text="*Entry DN" options="dynamic" optarray = "entryDN_ar">
        <SELECT>
        <MAPPING bindtoattribute="entryDN_ar" />
    </CELL>
    <CELL name="cn" formname="umsaadmin" formelementtype="input" linebreak="1" helpsection="cn">
        <INPUT type="text" text="*Full Name" size="30" maxlength="30"/>
        <MAPPING bindtoattribute="cn" />
    </CELL>

<CELL> name="Firstname" formname="umsaadmin" formelementtype="input" linebreak="1" helpsection="givenname" >
        <INPUT type="text" text="*Given Name (First Name)" size="30" maxlength="30"/>
        <MAPPING bindtoattribute="givenname" />
    </CELL>
    <CELL name="LastName" formname="umsaadmin" formelementtype="input" linebreak="1" helpsection="sn">
        <INPUT type="text" text="*Last Name" size="30" maxlength="30"/>
        <MAPPING bindtoattribute="sn" />
    </CELL>

<CELL> name="telephonenumber" formname="umsaadmin" formelementtype="input" linebreak="1" helpsection="telephonenumber">
        <INPUT type="telephonenumber" text="*Telephone Number" size="15" maxlength="20"/>
        <MAPPING bindtoattribute="telephonenumber" />
    </CELL>
    <CELL name="TelPw" formname="umsaadmin" formelementtype="input" linebreak="1" helpsection="telaccesspasswd">
        <INPUT type="numericpassword" text="*Telephone Access Password" size="10" maxlength="10"/>
        <MAPPING bindtoattribute="umpassword" />
    </CELL>
    <CELL name="Email" formname="umsaadmin" formelementtype="input" linebreak="1" helpsection="email">
        <INPUT type="email" text="*Email Address" size="35" />
        <MAPPING bindtoattribue="mail" />
    </CELL>

</DOCUMENT>
```

Figure 7B

APPLICATION SERVER CONFIGURED FOR DYNAMICALLY GENERATING WEB FORMS BASED ON EXTENSIBLE MARKUP LANGUAGE DOCUMENTS AND RETRIEVED SUBSCRIBER DATA

BACKGROUND OF THE INVENTION

1. Field of the Invention

The present invention relates to dynamic generation of a hypertext markup language (HTML) form by an application server configured for executing applications based on extensible markup language documents.

2. Description of the Related Art

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions accessible by a Common Gateway Interface (CGI) script. In addition, the web server may provide logging and monitoring capabilities.

Typically web applications display HTML forms in the form of static HTML pages from stored HTML files, alternately the HTML pages are generated dynamically using CGI scripts. In both these cases it becomes difficult to customize HTML forms because such customization requires either modifying the stored HTML files or modifying the CGI script code.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server, in response to receiving a user request from a user, accesses a selected XML page that defines at least a part of the voice application to be executed for the user. The application server then parses the XML page, and executes the operation described by the XML page, for example dynamically generating an HTML page having voice application control content, or fetching another XML page to continue application processing.

Commonly-assigned, copending application Ser. No. 09/559,637, filed Apr. 28, 2000, entitled Browser Based Arrangement for Developing Voice Enabled Web Applications Using Extensible Markup Language Documents, the disclosure of which is incorporated in its entirety herein by reference, discloses generation of an HTML document usable by a user to create or modify a stored XML document to define a voice application operation. The application server generates a prescribed HTML form and inserts selected application parameters from the XML document. The HTML form is supplied to a browser, enabling a user to input or modify application parameters for the corresponding XML document into the form. The application server, upon receiving the form from the web browser, inserts the input application parameters into the XML document, and stores the XML application document for execution.

As described previously, a primary concern is the ability to customize HTML forms. The use of customize HTML forms is particularly important in developing customizable web applications, for example self-administered user applications that enables a user to self-customize his or her web application, for example in the case of a subscriber desiring to adjust his or her settings in a unified communications system such as the commercially-available Cisco uOne system (4.1S).

SUMMARY OF THE INVENTION

There is a need for an arrangement that enables HTML forms to be customizable on a per-user basis, without the necessity of modifying static HTML files or modification of CGI scripts.

There also is a need for arrangement that enables HTML pages to be dynamically generated by an application server, on a user-specific basis, without the use of a common gateway interface that may affect the scalability of the application server.

There is also a need for an arrangement that enables an application server to dynamically generate HTML pages based on stored XML data and stored user data accessible by the application server.

These and other needs are attained by the present invention, where an application server, configured for dynamically generating a web page (e.g., HTML) document based on execution of XML documents, dynamically generates an HTML page having selected form elements based on a stored XML document that defines available HTML form elements and respective attributes, and based on user attributes retrieved by the application server from an open network database server (such as LDAP). The application server, in response to a request from a user, accesses an XML document configured for specifying attributes associated with the request; the XML document may specify as form elements menus that are available for generation based on qualified user attributes, or may specify HTML fields that can be generated for display on the HTML page based on the qualified user attributes. The application server also retrieves the user attributes, and dynamically generates the HTML page based on identifying the user attributes matching the qualified user attributes of the accessed XML document. Hence, HTML pages having form elements can be dynamically generated, providing personalized HTML pages without the necessity of modifying CGI scripts or stored HTML pages.

One aspect of the present invention provides a method in an application server. The method includes accessing a stored extensible markup language (XML) document based on receiving a web page request from a browser serving a user, the stored XML document specifying available web page form elements and respective attributes. The method also includes obtaining subscriber attribute information for the user from an Internet Protocol (IP) based database server configured for storing subscriber attributes for users, and generating a web page. The generated web page has selected form elements based on the available web page form elements specified in the stored XML document and the subscriber attribute information for the user. The accessing of the stored XML document enables an application runtime environment parsing the XML document to identify available web page form elements and the respective attributes for generation of a web page. Moreover, the access of subscriber attribute information enables the web page to be dynamically generated based on selection of form elements having attributes that satisfy prescribed conditions relative to the subscriber attribute information. Hence, a web page having user-specific menus and/or input fields can be dynamically generated within an application runtime environment, without the necessity of modifying a CGI script or a statically stored HTML document.

Another aspect of the present invention provides an application server configured for generating a web page. The application server includes HTTP interface configured for receiving a web page request from a browser serving a user and outputting to the browser a web page, and an interface configured for generating a query for subscriber attribute information for the user to an Internet protocol (IP) based database server configured for storing subscriber attributes for users. The application server also includes an application runtime environment configured for accessing a stored extensible markup language (XML) document based on the received web page request, the application runtime environment configured for generating the web page by inserting selected form elements based on available web page form elements specified within the stored XML document, and the selected form elements selected based on the subscriber attribute information.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 5 is a diagram illustrating a menu XML document used for specifying available menu elements.

FIGS. 7A and 7B are diagrams summarizing a web forms XML document used for generating a web page having selected HTML form fields according to an embodiment of the present invention.

BEST MODE FOR CARRYING OUT THE INVENTION

The disclosed embodiment is directed to the dynamic generation of HTML forms pages based on XML specifications, enabling a subscriber to customize his or her web application based on inputting or modifying a custom HTML form. In addition, HTML forms can easily be modified by modifying the XML documents describing the HTML forms. A description will first be given of the unified messaging architecture used to provide unified messaging services for subscribers, followed by a detailed description of the arrangement for dynamically generating HTML forms for self administration by unified messaging subscribers according to an embodiment of the present invention.

Figure 1:
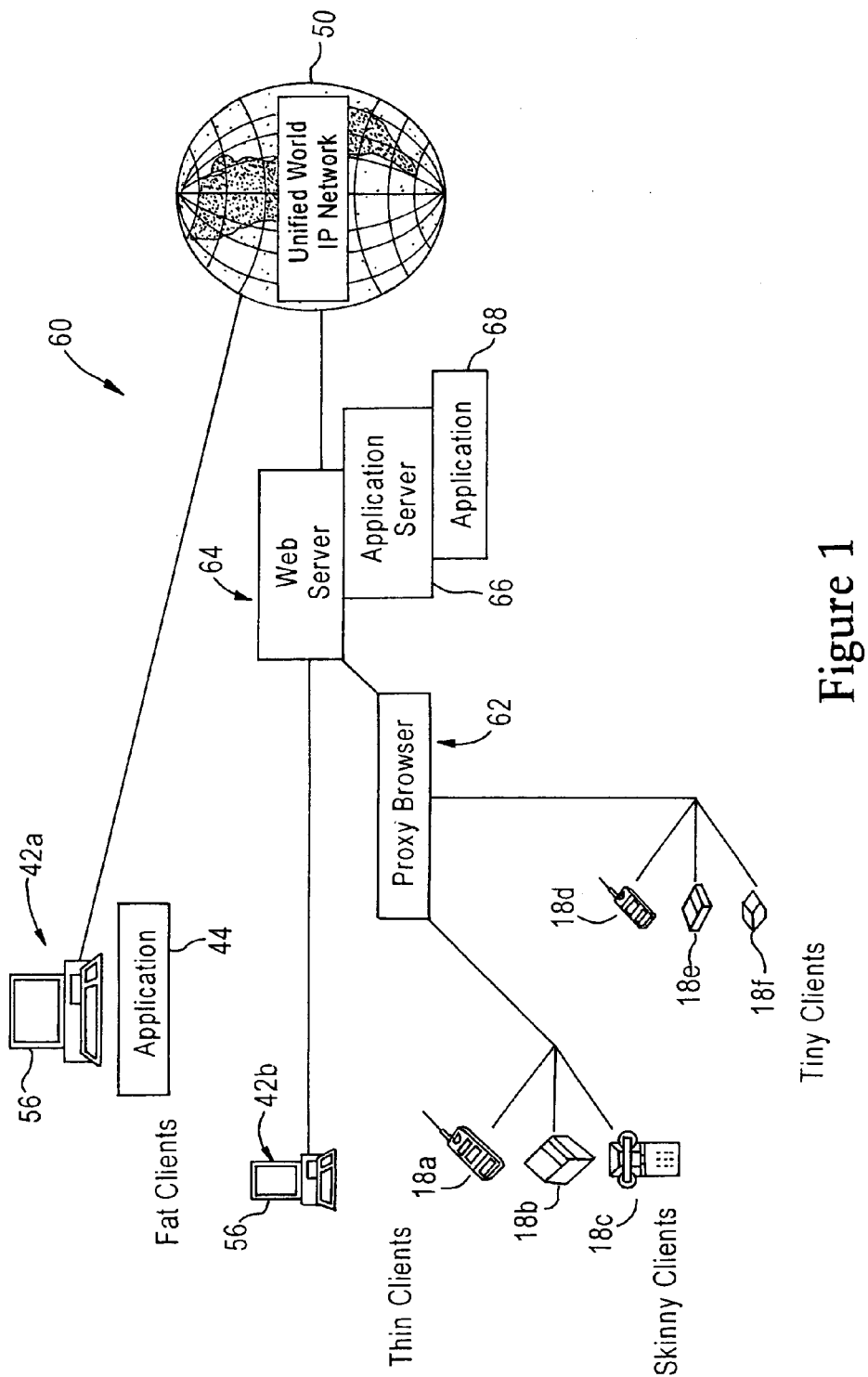
FIG. 1 is a block diagram illustrating an system enabling deployment of a unified messaging system, capable of executing voice enabled web applications, according to an embodiment of the present invention.
Figure 3:
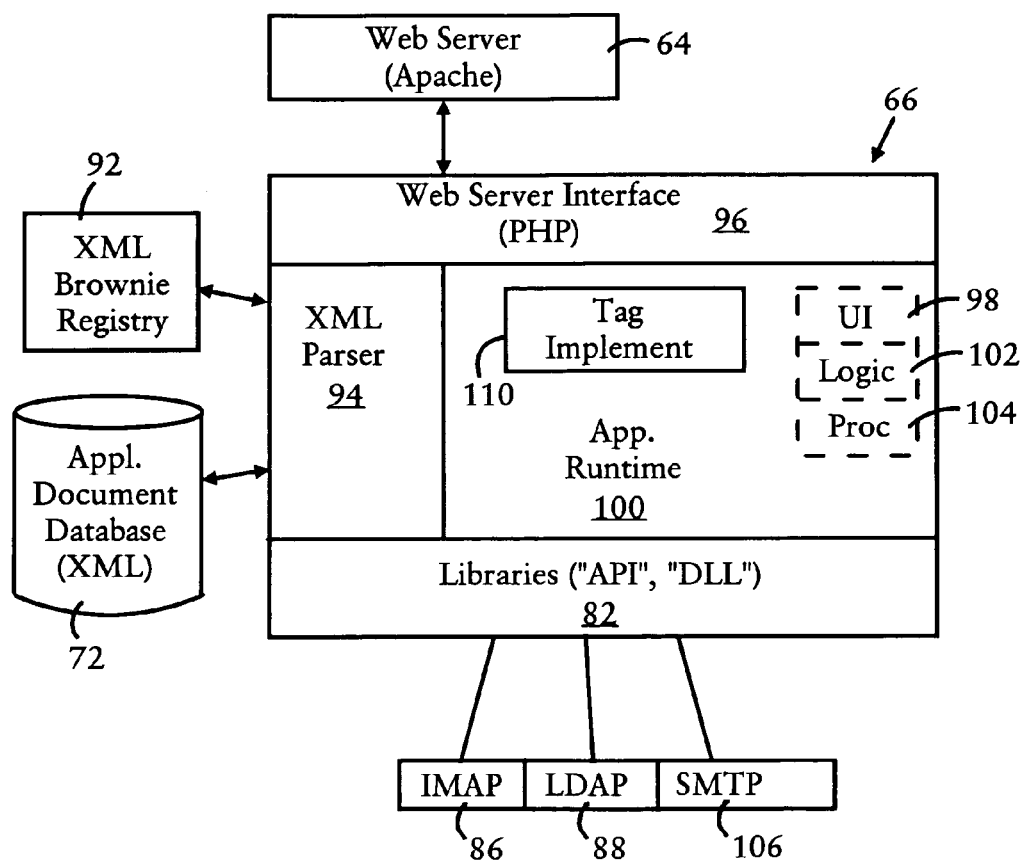
FIG. 3 is a diagram illustrating in detail the application server of FIGS. 1 and 2 according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., XML pages that define an application) and in response generates new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

Figure 2:
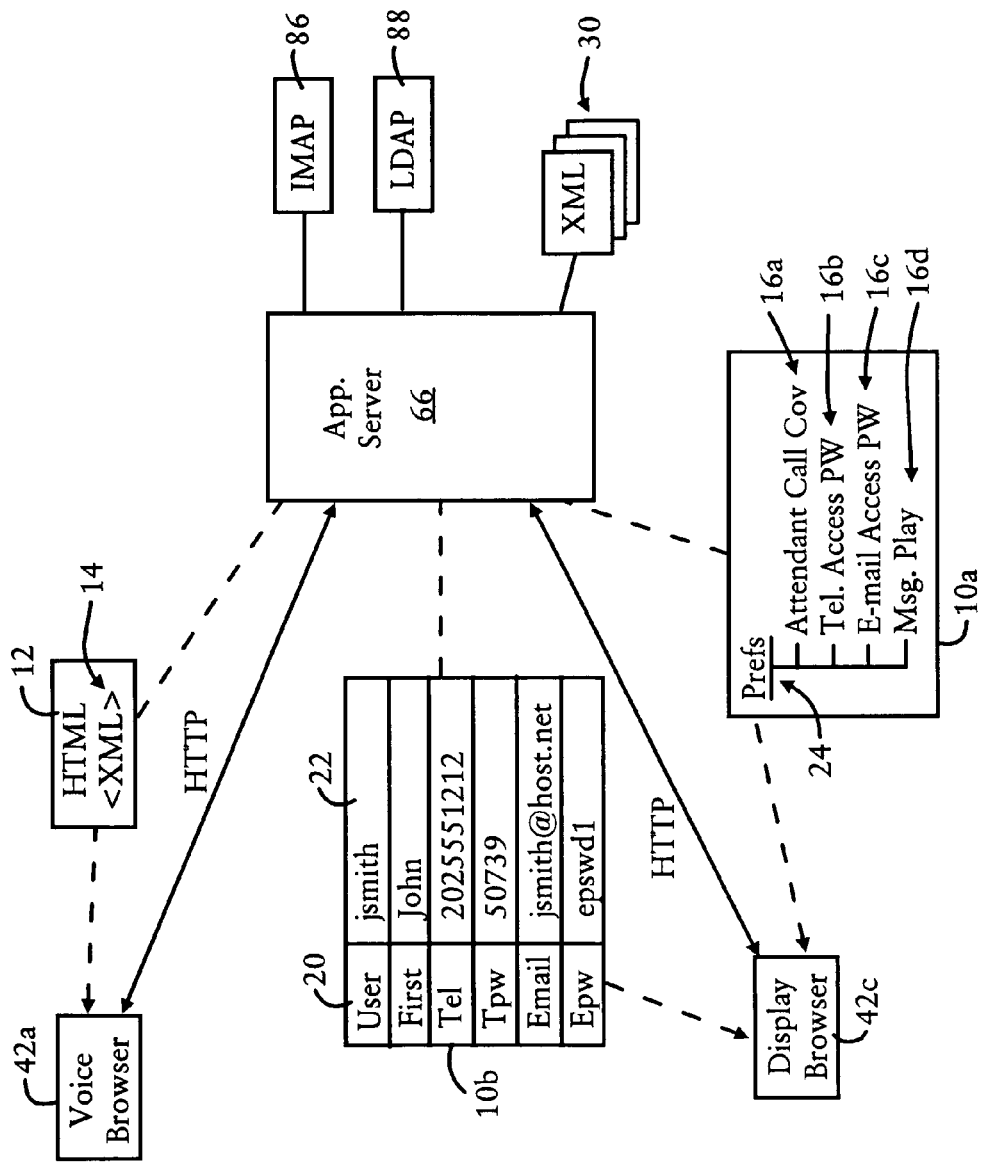
FIG. 2 is a diagram illustrating a user self-administration session controlled by the application server of FIG. 1 based on dynamic generation of web pages having selected form elements according to an embodiment of the present invention.

FIG. 2 is a diagram illustrating in further detail the interaction between the application server 66 and a browser 42c receiving an HTML page 10 during a self-administered subscriber provisioning session. In particular, the above description with respect to the browsers 42a and 42b and the application server 66 contemplate generation of an HTML web page 12 having XML control tags 14 for control of media content, for example during a messaging session with a subscriber. In contrast, the self-administered subscriber provisioning session described below provides a web-based tool that enables administrators to provision new services having respective configuration settings, or new accounts, within a subscriber directory server, for example an LDAP server, or a messaging server such as an IMAP message store. The self-administered subscriber provisioning session also provides a web-based tool that enables subscribers to change their personal settings and modify their subscriber profiles stored in the subscriber directory server.

The HTML pages 10 generated by the application server 66 and supplied to the browser 42c include form elements that enable the user to self-administer subscriber profile information for establishment and maintenance of the unified messaging service. A "form element" is defined as an element of a displayed web page that enables a user to post a corresponding request that affects access or storage of subscriber profile information. For example, the application server 66 may generate an HTML document 10a having selected form elements, implemented as menu elements 16 for a user menu 24, that enable a user to request retrieval of specific profile information such as attendant call coverage 16a, telephone access password 16b, e-mail access password 16c, or message playback preferences 16d. The menu 24 also may be displayed as a pull-down menu. Alternately the application server 66 may generate an HTML document 10b having selected form elements, implemented as HTML form fields 20 having respective input form elements 22, enabling the user to review, edit, and post the revised subscriber profile settings for storage in the subscriber profile directory 88.

As described below, the menu elements 16 are selected for dynamic generation of the web page 10a based on the user privileges, enabling the application server 66 to dynamically generate different user menus 24 depending on whether the user is an administrator, a user, etc. Similarly, the HTML form fields 20 are selected for dynamic generation of the web page 10b based on identification of relevant subscriber attributes between an XML document 30, used to specify the available form fields, and the retrieved subscriber profile information for the user.

Hence, the application server 66 is able to provide a personalized menu 24 of available operations that a subscriber may use during self-administration. Upon selecting a menu element 16, the browser 42c posts an HTTP request that specifies the requested operation, for example another submenu, or a dynamically generated HTML form page 10b.

FIG. 3 is a diagram illustrating in further detail the application server 66. One exemplary implementation of the application server 66 is the commercially-available Cisco Unified Open Network Exchange (Cisco uOne) (Products UONE-FOUND 4.1S, and UONE-VOICEMSG4.1S) including the uPower web-based administration tools from Cisco Systems, Inc. As described below, the disclosed embodiment provides an improvement to the existing uPower web-based administration tools by providing dynamically generated HTML documents.

The application server 66 receives via the web server 64 HTTP requests from either a PC-based web browser 42 capable of supplying full media content (e.g., audio, text, images, and streaming video), or a proxy browser 62 configured for serving as an HTTP interface for a user input device, such as a telephone 18, having limited media capabilities (e.g., audio only). In response to receiving the HTTP requests, the application server 66 accesses a selected XML document based on parameters specified within the HTTP request (e.g., commands specified within the URL), and based on application state determined from accessing a brownie, assuming the HTTP request specifies a valid session identifier. As described below, the application runtime environment within the application server 66 parses the XML tags within the accessed XML document, and dynamically generates an HTML page having selected form elements based on the available web page form elements specified in the stored XML document, and the subscriber attribute information retrieved for a corresponding subscriber.

The voice application server 66 is configured for accessing service application programming interfaces (API's) 82 to external resources based on prescribed procedures that may be called during parsing of an XML tags in a selected XML document. As described below, the application server 66 issues function calls to an API 82 for accessing the external resources for prescribed operations, enabling the deployment of a robust, scalable unified messaging system having messaging operations distributed across multiple platforms. In particular, the application server 66 accesses subscriber profile information from an IP-based database server 84 according to LDAP protocol. The application server 66 also is configured for storing and retrieving messages in a standardized format (e.g., e-mail with binary encoded attachments) in an IMAP messaging server 86 during messaging sessions.

The application server 66 is implemented as a server executing a PHP hypertext processor with XML parsing and processing capabilities, available open source on the Internet at http://www.php.net. As shown in FIG. 3, the server system 66 includes an XML parser 94 configured for parsing the application-defining XML documents stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. For example, the application server 66 may issue a function call to one of a plurality of IP protocol compliant remote resources 86, 88, or 106 according to IMAP protocol, LDAP Protocol, or SMTP protocol, respectively. For example, the PHP hypertext processor includes executable routines capable of accessing the IMAP or LDAP services. Note that the mechanisms for accessing the services 86, 88, or 106 should be established within the application server before use of XML documents that reference those services. Once the services 86, 88, or 106 are established, the application runtime environment 100 can perform a function operation by using executable functions specified by a function call rule set.

Figure 4A:
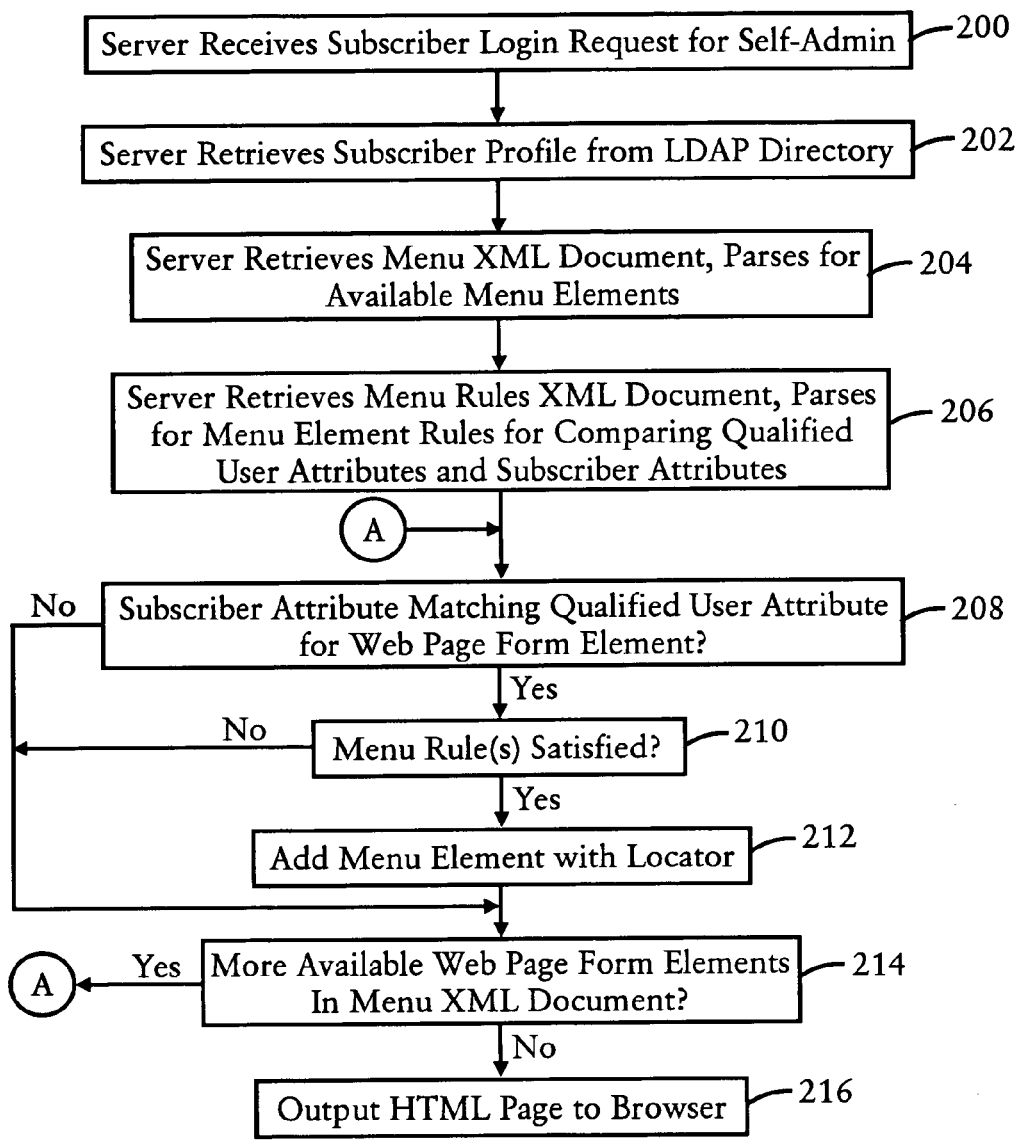
FIGS. 4A and 4B are diagrams summarizing the method of dynamically generating a web page having selected form elements, for user self-administration, according to an embodiment of the present invention.
Figure 4B:
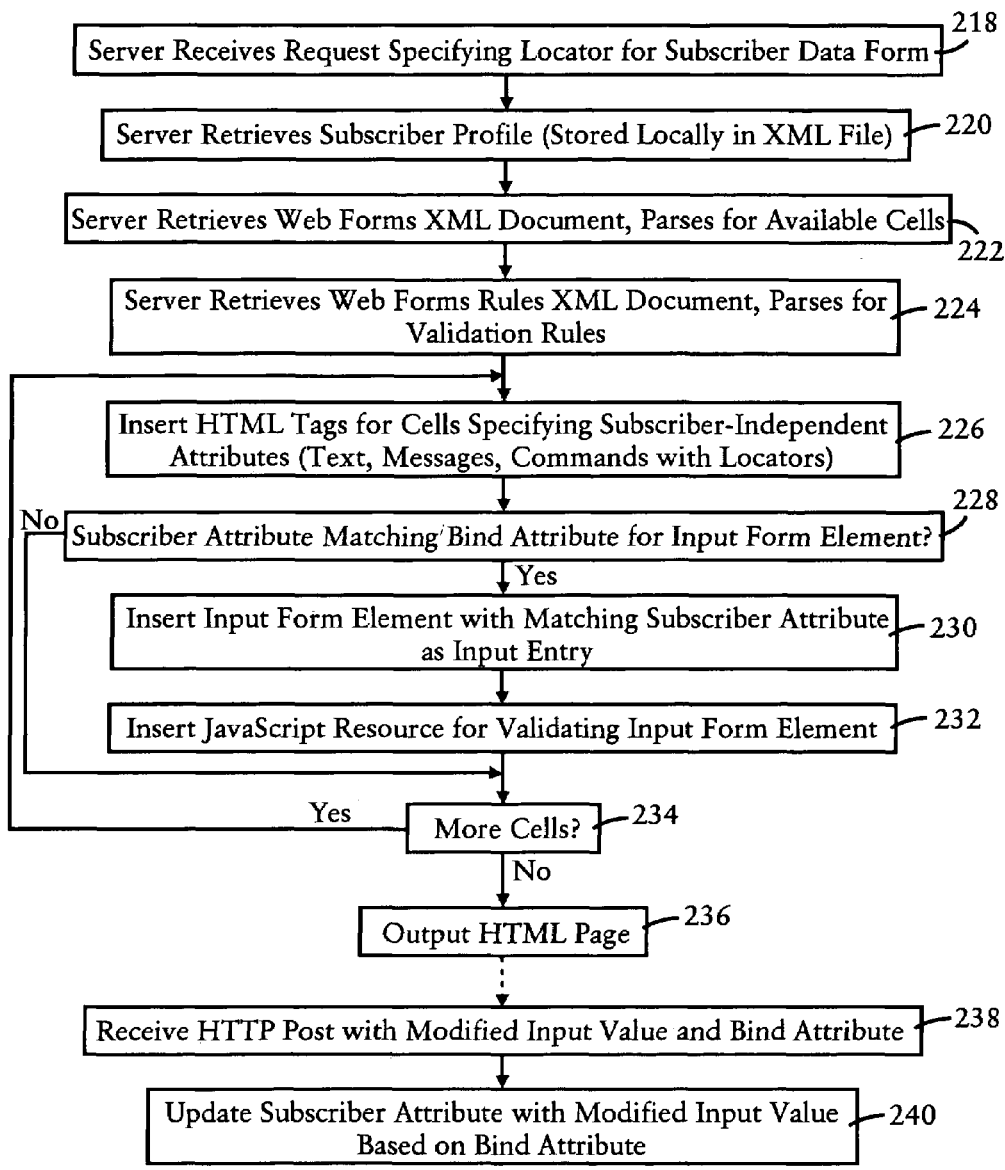

FIGS. 4A and 4B are diagrams illustrating self-provisioning operations executed by the application server 66 for dynamic generation of web pages 10 according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disc, etc.).

As shown in FIG. 4A, the method begins in step 200 by the application server 66 receiving from the browser 42*c* a subscriber login request for self administration, for example by posting to a prescribed uniform resource locator (URL). The application server retrieves in step 202 the subscriber profile information (set to default values for new users) from the LDAP directory 88 and locally stores the subscriber profile information, for example in a locally stored XML document.

The application server 66 retrieves in step 204 a top-level menu XML document 30*a*, illustrated in FIG. 5, and parses the menu XML document 30*a* to identify available menu elements to be selected as menu elements 16. In particular, the XML elements 300*a*, 300*b*, and 300*c* specify attributes for a top-level menu "Subscriber Provisioning" 302*a*, and sub-menu elements "Add Subscriber" 304*a* and "Add Message Notification Information" 304*b*, respectively. The sub menu elements 304 each specify a parent attribute 306 that identifies the parent menu 302, and a locator 308 that specifies another XML document to be accessed if the corresponding menu element is selected by the user.

Figure 6:
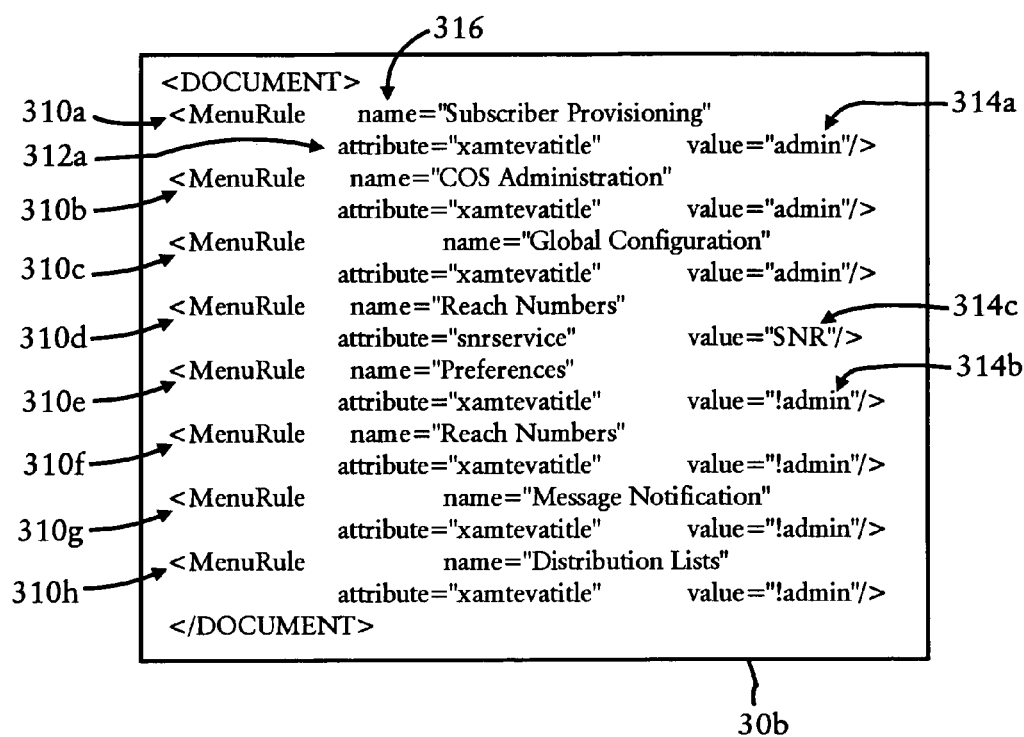
FIG. 6 is a diagram illustrating a menu rules XML document used for specifying menu rules used for comparing attributes of the menu XML document with subscriber attributes for selection of available menu elements.

The application server 66 retrieves in step 206 a menu rules XML document 30*b*, illustrated in FIG. 6, and parses for menu element rules 310 in order to compare a qualified user attribute 312 for a specified menu element 316 to a prescribed value 314. For example, the rule 310*a* specifies that the generation of the menu element 302*a* identified as "Subscriber Provisioning" by the name attribute 316 requires that the qualified user attribute 312*a*, identified within the LDAP directory as "xamtevatitle", must have a value of "admin" as specified by the value tag 314*a*; hence, the rules 310*a*, 310*b*, 310*c* each require that the user be identified as an administrator for generation of the respective menu elements "Subscriber Provisioning", "Class of Service" (COS), and "Global Administration", respectively. In contrast, the rules 310*e*, 310*f*, 310*g*, and 310*f* each require that the user be identified as other than an administrator (e.g., messaging subscriber) for generation of the respective menu elements "Preferences", "Reach Numbers", "Message Notification", and "Distribution Lists", respectively.

Hence, the application server 66 initiates dynamic generation of an HTML page 10*a* having a menu 24 composed of menu elements 16 by determining in step 208 if the subscriber attribute information retrieved from the LDAP directory includes a subscriber attribute that matches a qualified user attribute 312 for the web page menu element 16; if there is a matching attribute, the application server 66 determines in step 210 whether the appropriate menu rule 310 is satisfied. If the appropriate menu rule is satisfied in step 210, the application server 66 adds in step 212 the menu element 16 specified by the corresponding XML element 300 and the corresponding locator 308. If certain menu elements are to be supplied to all users, then the menu rules XML document 30b need not specify rules for such menu elements. Additional details regarding the menu XML document 30a and the menu rules XML document 30b are described in the attached appendix.

If in step 214 additional web page menu elements 16 are available based on additional XML elements 300, the application server 66 continues parsing each of the elements 300 until evaluation of all of the available web page menu elements 16 is completed. The application server 66 then outputs the HTML page 10a having the menu 24 to the browser 42c. The user can then select one of the available menu options to perform a prescribed provisioning operation, described below. Moreover, the dynamic execution of the web page 10a enables a personalized menu 24 to be generated for the user, such that one menu can be generated for an administrator, and another menu can be generated for a messaging subscriber, etc.

FIG. 4B illustrates the dynamic generation of an HTML page 10b having dynamically selected HTML form fields according to an embodiment of the present invention. The application server 66 receives in step 218 a request, for example that specifies a locator for a subscriber data form 10b. The locator specifies a selected XML document, summarized as document portions 30c and 30d in FIGS. 7A and 7B, respectively, that specifies available web page form elements for display as HTML form fields 20.

In particular, the document portion 30c illustrated in FIG. 7A specifies document type descriptors that define XML elements and XML attributes. Specifically, the document type descriptor 320 specifies that the web page form XML document portion 30d includes at least one cell 322 that specifies a corresponding available web page form element for display as an HTML form field 20 on the web page 10b. Each XML cell 322 specifies one the following elements: an INPUT element, a SELECT element, a HEADING element, a MESSAGE element, a TEXT element, or a BOLDTEXT element. For example, the cells 322a and 322b specify HEADING elements 324a and 324b, respectively; the cell 322c specifies a SELECT element 326 and a mapping attribute 328a used to identify the subscriber attribute to be modified based on user input, described below. The cell 322d and 322e specify INPUT elements 330a and 330b that define generation of an HTML input form element 22 for display, modification, and storage of respective selected subscriber attributes 22 in the HTML web page 10b. Additional details describing the XML tags used in the web forms XML document 30c/30d are disclosed in the attached appendix.

Generation of the HTML page 10b having the selected HTML form fields 20 for modifying selected subscriber attributes 22 will now be described with reference to FIG. 4B. The application server 66 retrieves the subscriber profile in step 220, for example by accessing a locally stored XML file storing the previously-retrieved subscriber profile information. The application server 66 retrieves in step 222 the web forms XML document 30c/30d as illustrated in FIGS. 7A and 7B, and parses the web forms XML document for available cells 322. The application server 66 also retrieves in step 224 a web forms rules XML document that specifies rules for validating respective inputs, described in detail in the attached appendix.

The application server 66 begins generation of the HTML page 10b by inserting in step 226 HTML tags for cells (e.g., 322a, 322b) that specify subscriber-independent attributes, such as text, messages, or commands with locators: if a message is subscriber specific is set by a global variable, other logical processing may occur. The application server 66 then selects user-dependent cells for insertion of the respective web pages by determining, for example, whether in step 228 the subscriber attribute matches a corresponding bind attribute 328 for an input form element 330: if there is a match between the subscriber attribute and the bind attribute, the application server 66 inserts in step 230 the input form field 20 and the corresponding matching subscriber attribute as an input entry (i.e., element) 22. If the accessed web forms rules XML document specifies a validation rule, the application server 66 inserts in step 232 an executable resource, for example a JavaScript resource, that enables the display browser 42c to validate the data input to a corresponding input form element 22. The application server continues in step 234 to parse any additional cells 322 until all available HTML form fields have been reviewed for selection. The application server 66 then outputs the completed HTML page in step 236.

Hence, the application server 66 is able to dynamically generate within an application runtime environment an HTML page 10b having selected form fields with respective matching attributes from the subscriber directory 88. The browser 42c displays the HTML page 10b, enabling the user to select, input, and modify subscriber preferences. In addition, the JavaScript resource inserted in step 232 automatically validates input entries once an input form field 20 is deselected (indicating data entry is complete for that field). If the JavaScript resource determines an error, the user is notified and prompted to re-enter the appropriate data in the correct format. Once the user completes the form, the user can post the web page to a prescribed URL.

The application server 66, upon receiving in step 238 the HTTP post with the modified input value and bind attribute in step 238, updates in step 240 the subscriber attribute information with the modified input value based on the corresponding bind attribute.

According to the disclosed embodiment, web pages can be dynamically generated based on XML pages defining available web page elements, and matching subscriber attributes retrieved from the subscriber profile directory. The dynamic generation of web pages by parsing the XML files provides scalability by use of the configured for XML processing; moreover, applications can easily be modified by editing XML files to change a user presentation for a particular installation. Hence, the disclosed arrangement provides flexibility and scalability in deployment of self-administered applications.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server, the method comprising:

accessing a stored extensible markup language (XML) document based on receiving a web page request from a browser serving a user, the stored XML document specifying available web page form elements and respective attributes;

retrieving subscriber attribute information about the user by accessing an Internet Protocol (IP) based database server configured for storing subscriber attributes about users; and generating a web page having selected form elements based on the available web page form elements specified in the stored XML document and the subscriber attribute information about the user; wherein:

the accessing step includes accessing the stored XML document specifying available web page form elements as respective menu elements for a user menu; and the generating step includes adding within the web page selected menu elements based on the available menu elements specified in the stored XML document having respective qualified user attributes relative to the subscriber attribute information about the user.

2. The method of claim 1, wherein the generating step includes generating the web page as a hypertext markup language (HTML) web page.

3. The method of claim 1, further comprising accessing a second stored XML document that specifies rules for comparing the respective qualified user attributes with the subscriber attribute information.

4. The method of claim 3, wherein the generating step includes selecting the selected menu elements from the available menu elements based on at least one identified subscriber attribute from the subscriber attribute information satisfying the respective rules for the selected menu elements.

5. The method of claim 1, wherein the stored XML document specifies descriptors identifying available attributes for the menu elements, the available attributes including a name attribute, a parent attribute for identifying a parent menu for the corresponding menu element, and a value attribute for identifying a second stored XML document to be retrieved for execution based on selection of the corresponding menu element.

6. The method of claim 5, wherein the generating step includes generating, for one of the selected menu elements having a corresponding specified value attribute identifying the corresponding second stored XML document, a locator that identifies the corresponding second stored XML document.

7. The method of claim 1, wherein each of the accessing the stored XML document, retrieving the subscriber attribute information by accessing the IP based database server, and generating the web page are executed by the application server.

8. The method of claim 1, wherein the generating includes selecting the selected form elements by the application server from among the available web page form elements specified in the stored XML document, and further selected based on the subscriber attribute information.

9. A method in an application server, the method comprising:

accessing a stored extensible markup language (XML) document based on receiving a web page request from a browser serving a user, the stored XML document specifying available web page form elements and respective attributes;

retrieving subscriber attribute information about the user by accessing an Internet Protocol (IP) based database server configured for storing subscriber attributes about users; and generating a web page having selected form elements based on the available web page form elements specified in the stored XML document and the subscriber attribute information about the user; wherein:

the accessing step includes accessing the stored XML document specifying cells, each cell specifying a corresponding available web page form element for display as an HTML form field on the web page; and the generating step including adding within the web page selected HTML form fields based on the subscriber attribute information about the user;

wherein the generating step includes:

adding a first type of selected HTML form fields for display of information independent of the subscriber attribute information;

adding a second type of selected HTML form fields based on the respective cells having matching attributes relative to the subscriber attribute information, wherein at least one of the second type of selected HTML form fields includes an input form element.

10. The method of claim 9, further comprising accessing a second stored XML document based on parsing the stored XML document, the second stored XML document specifying validation rules for a respective plurality of the input form elements, the generating step further including adding within the web page an executable resource, configured for validating an input value entered by the user into a corresponding input form element, based on the corresponding validation rule specified by the second XML document.

11. The method of claim 9, wherein the generating step further includes adding a third type of selected HTML form fields for display of action elements, the cells specifying the third type of selected HTML form fields each specifying a corresponding second stored XML document for execution of a corresponding action.

12. The method of claim 11, wherein the generating step further includes generating, for each of the third type of selected HTML form fields, a locator that identifies the corresponding second stored XML document.

13. The method of claim 9, wherein the step of adding the second type of selected HTML form fields includes, for each input form element:

identifying a corresponding bind attribute within the corresponding cell and inserting a corresponding subscriber attribute matching the bind attribute within the input form element.

14. The method of claim 13, further comprising:

receiving a second page request from the browser specifying a modified user input and the corresponding bind attribute for at least one input form element; and updating the corresponding subscriber attribute based on the corresponding bind attribute.

15. The method of claim 9, wherein the generating step includes:

adding a selected HTML form field that includes an input form element based on a corresponding cell specified in the stored XML document that identifies a bind attribute; and inserting a corresponding subscriber attribute from the subscriber attribute information and matching the bind attribute within the input form element.

16. The method of claim 15, further comprising:

receiving a second page request from the browser specifying a modified user input and the corresponding bind attribute for at least one input form element; and updating the corresponding subscriber attribute based on the corresponding bind attribute.

17. An application server configured for generating a web page, the application server including:

an HTTP interface configured for receiving a web page request from a browser serving a user and outputting to the browser a web page;

an interface configured for retrieving subscriber attribute information about the user by accessing an Internet protocol (IP) based database server configured for storing subscriber attributes about users; and an application runtime environment configured for accessing a stored extensible markup language (XML) document based on the received web page request, the application runtime environment configured for generating the web page by inserting selected form elements based on available web page form elements specified within the stored XML document, and the selected form elements selected based on the subscriber attribute information;

wherein the application runtime environment is configured for accessing a second stored XML document that specifies rules for comparing the subscriber attribute information with specified attributes for the available web page form elements, the application runtime environment selecting the form elements based on the rules.

18. The server of claim 17, wherein the interface is configured for accessing the database server according to LDAP protocol.

19. The system of claim 17, wherein the application runtime environment generates, based on the stored XML document, the selected form elements as respective menu elements for a user menu.

20. The system of claim 17, wherein the stored XML document specifies cells, each cell specifying a corresponding available web page form element for display as an HTML form field on the web page, the application runtime environment generating within the web page selected HTML form fields based on parsing the stored XML document and evaluating the cells relative to the subscriber attribute information.

21. The system of claim 20, wherein the application runtime environment inserts within one of the selected HTML form fields an input form element, the application runtime environment adding within the web page an executable resource configured for validating an input value entered by the user into the corresponding input form element, based on a prescribed validation rule accessed by the application runtime environment.

22. The system of claim 20, wherein the application runtime environment inserts within one of the selected HTML form fields an input form element based on a corresponding cell specified in the stored XML document that identifies a bind attribute, the application runtime environment inserting a subscriber attribute from the subscriber attribute information into the input form element based on the corresponding bind attribute.

23. The system of claim 22, wherein the application runtime environment is configured for updating the subscriber attribute with a modified user input in response to reception of a second web page request from the browser specifying the modified user input and the corresponding bind attribute for at least one input form element.

24. The server of claim 17, wherein the application runtime environment is configured for selecting the selected form elements from among the available web page form elements specified in the stored XML document, and further selected based on the subscriber attribute information.

25. A system configured for generating a web page, the system including:

means for accessing a stored extensible markup language (XML) document based on receiving a web page request from a browser serving a user, the stored XML document specifying available web page form elements and respective attributes;

means for retrieving subscriber attribute information about the user by accessing an Internet Protocol (IP) based database server configured for storing subscriber attributes about users; and means for generating a web page having selected form elements based on the available web page form elements specified in the stored XML document and the subscriber attribute information about the user; wherein:

the stored XML document specifies available web page form elements as respective menu elements for a user menu; and the generating means is configured for adding within the web page selected menu elements based on the available menu elements specified in the stored XML document having respective qualified user attributes relative to the subscriber attribute information about the user.

26. The system of claim 25, wherein the generating means is configured for generating the web page as a hypertext markup language (HTML) web page.

27. The system of claim 25, wherein the accessing means is configured for accessing a second stored XML document that specifies rules for comparing the respective qualified user attributes with the subscriber attribute information.

28. The system of claim 27, wherein the generating means is configured for selecting the selected menu elements from the available menu elements based on at least one identified subscriber attribute from the subscriber attribute information satisfying the respective rules for the selected menu elements.

29. The system of claim 25, wherein the stored XML document specifies descriptors identifying available attributes for the menu elements, the available attributes including a name attribute, a parent attribute for identifying a parent menu for the corresponding menu element, and a value attribute for identifying a second stored XML document to be retrieved for execution based on selection of the corresponding menu element.

30. The system of claim 29, wherein the generating means is configured for generating, for one of the selected menu elements having a corresponding specified value attribute identifying the corresponding second stored XML document, a locator that identifies the corresponding second stored XML document.

31. The server of claim 25, wherein the means for generating is configured for selecting the selected form elements from among the available web page form elements specified in the stored XML document, and further selected based on the subscriber attribute information.

32. A system configured for generating a web page, the system including:

means for accessing a stored extensible markup language (XML) document based on receiving a web page request from a browser serving a user, the stored XML document specifying available web page form elements and respective attributes;

means for retrieving subscriber attribute information about the user by accessing an Internet Protocol (IP) based database server configured for storing subscriber attributes about users; and means for generating a web page having selected form elements based on the available web page form elements specified in the stored XML document and the subscriber attribute information about the user, wherein:

the stored XML document specifies cells, each cell specifying a corresponding available web page form element for display as an HTML form field on the web page; and the generating means is configured for adding within the web page selected HTML form fields based on the subscriber attribute information about the user;

wherein the generating means is configured for:

adding a first type of selected HTML form fields, specified by the stored XML document, for display of information independent of the subscriber attribute information; and adding a second type of selected HTML form fields, specified by the stored XML document, based on the respective cells having matching attributes relative to the subscriber attribute information, wherein at least one of the second type of selected HTML form fields includes an input form element.

33. The system of claim 32, wherein the accessing means is configured for accessing a second stored XML document based on parsing the stored XML document, the second stored XML document specifying validation rules for a respective plurality of the input form elements, the generating means adding within the web page an executable resource, configured for validating an input value entered by the user into a corresponding input form element, based on the corresponding validation rule specified by the second XML document.

34. The system of claim 32, wherein the generating means is configured for adding a third type of selected HTML form fields, specified by the stored XML document, for display of action elements, the cells specifying the third type of selected HTML form fields each specifying a corresponding second stored XML document for execution of a corresponding action.

35. The system of claim 34, wherein the generating means is configured for generating, for each of the third type of selected HTML form fields, a locator that identifies the corresponding second stored XML document.

36. The system of claim 32, wherein generating means adds the second type of selected HTML form fields for each input form element by:

identifying a corresponding bind attribute within the corresponding cell; and inserting a corresponding subscriber attribute matching the bind attribute within the input form element.

37. The system of claim 36, further comprising:

means for receiving a second page request from the browser specifying a modified user input and the corresponding bind attribute for at least one input form element; and means for updating the corresponding subscriber attribute based on the corresponding bind attribute.

38. The system of claim 32, wherein the generating means is configured for:

adding a selected HTML form field that includes an input form element based on a corresponding cell specified in the stored XML document that identifies a bind attribute; and inserting a corresponding subscriber attribute from the subscriber attribute information and matching the bind attribute within the input form element.

39. The system of claim 38, further comprising:

means for receiving a second page request from the browser specifying a modified user input and the corresponding bind attribute for at least one input form element; and means for updating the corresponding subscriber attribute based on the corresponding bind attribute.

* * * * *